United States Patent
Schluse et al.

(10) Patent No.: US 11,648,986 B2
(45) Date of Patent: May 16, 2023

(54) VEHICLE ROOF HAVING A FIXED ROOF ELEMENT

(71) Applicant: Webasto SE, Stockdorf (DE)

(72) Inventors: Kevin Schluse, Stockdorf (DE); Guido Bott, Stockdorf (DE); Bernhard Harnischfeger, Stockdorf (DE); Peter Strohmayr, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 171 days.

(21) Appl. No.: 17/260,660

(22) PCT Filed: Aug. 20, 2019

(86) PCT No.: PCT/EP2019/072251
§ 371 (c)(1),
(2) Date: Jan. 15, 2021

(87) PCT Pub. No.: WO2020/038932
PCT Pub. Date: Feb. 27, 2020

(65) Prior Publication Data
US 2021/0261199 A1    Aug. 26, 2021

(30) Foreign Application Priority Data

Aug. 22, 2018 (DE) .................. 10 2018 120 483.3
Oct. 9, 2018 (DE) .................. 10 2018 124 917.9

(51) Int. Cl.
*B62D 25/06* (2006.01)
*B62D 27/02* (2006.01)

(52) U.S. Cl.
CPC ........... *B62D 25/06* (2013.01); *B62D 27/026* (2013.01)

(58) Field of Classification Search
CPC ....... B62D 25/06; B62D 27/026; B62D 29/00
(Continued)

(56) References Cited

U.S. PATENT DOCUMENTS 6,409,258 B1 * 6/2002 Grimm .................. B62D 25/06
296/210
6,848,739 B2 * 2/2005 Stallfort ................ B62D 25/06
296/215

(Continued)

FOREIGN PATENT DOCUMENTS

DE         10306957 A1    9/2004
DE     102004007988 A1    9/2005

(Continued)

OTHER PUBLICATIONS

International Search Report for PCT/EP2019/072251 dated Dec. 12, 2019 in English and German (7 pages).

(Continued)

*Primary Examiner* — Pinel E Romain
(74) *Attorney, Agent, or Firm* — Fitch, Even, Tabin & Flannery, LLP (57) ABSTRACT

A vehicle roof having a fixed roof element having a glass, plastic or sheet metal panel provided with a circumferential molded section which is formed by a section foam molded to an edge or a section injection molded to the edge. A circumferential frame-like connecting plate may be fastened to the glass, plastic or sheet metal panel by means of the molded section and has a circumferential adhesive surface for attaching the fixed roof element to a vehicle body.

10 Claims, 6 Drawing Sheets

(58) Field of Classification Search
USPC .................................................. 296/187.01
See application file for complete search history.

(56) References Cited

U.S. PATENT DOCUMENTS

| | | | | |
|---|---|---|---|---|
| 6,971,704 B2* | 12/2005 | Cocaign | ................. | B62D 25/06 |
| | | | | 296/97.8 |
| 9,016,775 B2* | 4/2015 | Gneiting | .............. | B62D 29/043 |
| | | | | 296/210 |
| 9,114,836 B1* | 8/2015 | Hinz | .................... | B62D 29/008 |
| 2006/0208539 A1* | 9/2006 | Ludwig | ................. | B62D 25/06 |
| | | | | 296/210 |
| 2006/0232093 A1 | 10/2006 | Boehm et al. | | |
| 2008/0272625 A1 | 11/2008 | Paetz et al. | | |
| 2008/0302469 A1* | 12/2008 | Erbeck | ................... | B29C 70/84 |
| | | | | 156/229 |
| 2018/0145402 A1* | 5/2018 | Kamioku | ................. | B60J 7/043 |

FOREIGN PATENT DOCUMENTS

| | | | |
|---|---|---|---|
| DE | 102014003969 A1 | | 9/2015 |
| DE | 102014010420 A1 | | 1/2016 |
| DE | 102017010622 A1 | | 5/2018 |
| WO | WO-2005115782 A1 * | 12/2005 | .............. B60J 10/82 |

OTHER PUBLICATIONS

International Preliminary Report on Patentability for PCT/EP2019/072251 dated Feb. 23, 2021 in English (10 pages).

\* cited by examiner

VEHICLE ROOF HAVING A FIXED ROOF ELEMENT

CROSS-REFERENCE TO RELATED APPLICATIONS

This application is a U.S. national phase application filed under 35 U.S.C. § 371 of International Application No. PCT/EP2019/072251, filed 20 Aug. 2019, designating the United States, which claims priority from German Patent Application No. 10 2018 120 483.3, filed 22 Aug. 2018 and from German Patent Application No. 10 2018 124 917.9, filed 9 Oct. 2018, which are hereby incorporated herein by reference in their entirety for all purposes.

FIELD

The invention relates to a vehicle roof having the features of the preamble of claim 1.

BACKGROUND

Such a vehicle roof is known from practice and comprises a fixed roof element as the outer skin element of the roof. Said fixed roof element constitutes an element which is disposed rigidly as against a vehicle body and which comprises a planar glass, plastic or sheet metal panel. In the known vehicle roof, the glass, plastic or sheet metal panel is provided with a circumferential section foam molded to an edge and made of polyurethane, via which functional elements, for example guide rails of a shading system, can on the one hand be attached and via which the fixed roof element can on the other hand be attached to the vehicle body by means of a bead of glue. Since a separating agent needs to be employed in the molding tool when producing the section foam molded to the edge, the polyurethane is not gluable at its outside without further ado. In order to guarantee a sufficient adhesion of the bead of glue at the polyurethane section foam molded to the edge, it has to be machined by milling, grinding or the like before the bead of glue is applied. This is an additional work step which is time-consuming and cost-intensive. Additionally, an excess of polyurethane needs to be left over when producing the section foam molded to the edge in order to guarantee that the desired nominal dimensions have been achieved after the machining. Furthermore, the geometrical variety which can be realized by means of the machining tool is also limited.

SUMMARY

The object of the invention is to provide a vehicle roof of the kind mentioned above with which a mechanical finishing of the section foam molded to the edge is not required while the fixed roof element can nonetheless reliably be attached to a vehicle body via an adhesive connection.

In accordance with the invention, this object is attained by the vehicle roof having the features of claim 1.

In accordance with the invention, a vehicle roof is proposed which comprises a fixed roof element having a glass, plastic or sheet metal panel. Said panel is provided with a molded section which is realized as a section foam molded to an edge or a section injection molded to the edge or as a section foam molded around the edge or a section injection molded around the edge. Additionally, a circumferential frame-like connecting plate is provided which is fastened to the glass, plastic or sheet metal panel by means of the molded section and which has a circumferential adhesive surface for attaching the fixed roof element to a vehicle body.

In comparison to the vehicle roof described above according to the state of the art, the fixed roof element is attached to the vehicle body via the connecting plate, i.e. via an insert of the molded section, in particular made of metal, which remains free of any separating agents when molding the molded section. The connecting plate is molded to the planar panel made of glass, plastic or sheet metal via the molded section and constitutes an outer ring which has a surface which is homogeneous and gluable. A milling process for adapting the geometry of the section foam molded to the edge is not required since the interface for the vehicle body is formed by the connecting plate. A mechanical finishing of the molded section, which is formed by the section foam molded around the edge, the section injection molded around the edge, the section foam molded to the edge or the section injection molded to the edge, is not required, whereby the production times and also the costs for the vehicle roof are also reduced. As a side effect, the connecting plate increases the stiffness of the fixed roof element.

In a preferred embodiment of the vehicle roof according to the invention, the adhesive surface forms a frame surface which surrounds the molded section. In relation to the center of the planar panel, the adhesive surface is thus disposed on the outside.

In order to be able to provide a convenient resting and adhesive surface at the connecting plate, the adhesive surface, in a special embodiment of the vehicle roof according to the invention, is realized at a chamfer of the connecting plate, said chamfer being on the outside in relation to a center of the fixed roof element.

Expediently, the vehicle roof according to the invention has a roof substructure which may be formed by a roof frame or the like and which is disposed rigidly as against the vehicle body. The fixed roof element is expediently fastened to this roof substructure via a bead of glue which is disposed at the adhesive surface.

In a preferred embodiment of the vehicle roof according to the invention which is connected with short manufacturing times, the connecting plate is realized in one piece. As an alternative, it is, however, also conceivable that the connecting plate is composed of multiple leg elements which form a frame-like element when assembled.

In order to be able to also integrate functional elements apart from attaching the fixed roof element via the connecting plate, the connecting plate, in an expedient embodiment of the vehicle roof according to the invention, has a fixing section for attaching a functional element, in particular an element of a shading assembly. For example, the fixing section has screw-on points for guide rails or also for mounting elements of a winding shaft.

In order to also give the vehicle roof according to the invention a pleasing appearance at the side facing a vehicle interior, a special embodiment of the vehicle roof according to the invention has a circumferential cover rib which is formed by the molded section and in particular surrounds a see-trough section of the fixed roof element.

In order to be able to realize the molded section in a positionally accurate fashion with sufficient thickness, which guarantees a stable attaching of the planar glass, plastic or sheet metal panel, the connecting plate, in an advantageous embodiment of the vehicle roof according to the invention, has a circumferential reinforcing fin on the upper side which is filled by the molded section.

The connecting plate cannot only bear the planar glass, plastic or sheet metal panel, but also at least one other panel, in particular a cover panel. Thus, in a special embodiment of the vehicle roof according to the invention, at least one other cover panel made of glass, plastic or sheet metal is fastened to the connecting plate via a second molded section which is formed by a foam molded section or an injection molded section which is realized so as to be preferably circumferential. Expediently, the foam molded section or the injection molded section which forms the second molded section is produced, when producing the vehicle roof according to the invention, in the same tool and at the same time as the molded section for fastening the planar glass, plastic or sheet metal panel.

For the second molded section to also have a defined course and sufficient thickness, the connecting plate expediently has a second upper-side reinforcing fin which is filled by the molded section.

For realizing a panoramic roof which has a roof opening system having a movable lid element or another fixed roof element, the connecting plate can be realized in such a way that it defines a first roof opening which is covered by the glass, plastic or sheet metal panel for realizing the fixed roof element, and that it realizes a second roof opening which can selectively be closed or opened by means of a lid element or which is covered, for realizing the other fixed roof element, by a second glass, plastic or sheet metal panel which cannot be displaced as against the connecting plate.

Other advantages and advantageous embodiments of the subject-matter of the invention are apparent from the description, the drawing and the claims.

BRIEF DESCRIPTIONS OF THE DRAWINGS

One exemplary embodiment of the vehicle roof according to the invention is illustrated in a schematically simplified manner in the drawing and will be explained in more detail in the following description.

DETAILED DESCRIPTION

FIGS. 1 to 4 show a roof 10 of a passenger vehicle (not illustrated in more detail) which is realized as a panoramic roof and has a fixed roof element 12 which extends from the rear edge of the roof 10 up to a central region of the roof 10. In the front of the fixed roof element 12, a roof opening is realized which can be closed by means of a displaceable lid element 14. The lid element 14, by means of displacing kinematics (not illustrated in more detail), can be displaced between the closed position illustrated in FIG. 1 and an open position in which the roof opening is cleared at least partially and in which the lid element 14 has been moved over the fixed roof element 12.

The fixed roof element 12 (illustrated on its own in FIGS. 2 to 4) comprises a glass panel 16 which forms an outer skin element of the roof and which is curved. At its circumferential edge, the glass panel 16 is provided with a circumferential frame-like connecting plate 18 which is attached to the lower side of the glass panel 16 via a circumferential section foam molded to the edge 20 from polyurethane and which serves to fix the fixed roof element 12 at a roof substructure which is fixed relative to the vehicle and to fix a shading assembly. The connecting plate 18 is a one-piece punched or bent piece from steel or also from a light metal. The section foam molded to the edge 20 fills an upper-side circumferential reinforcing fin 21 of the connecting plate 18.

Figure 1:
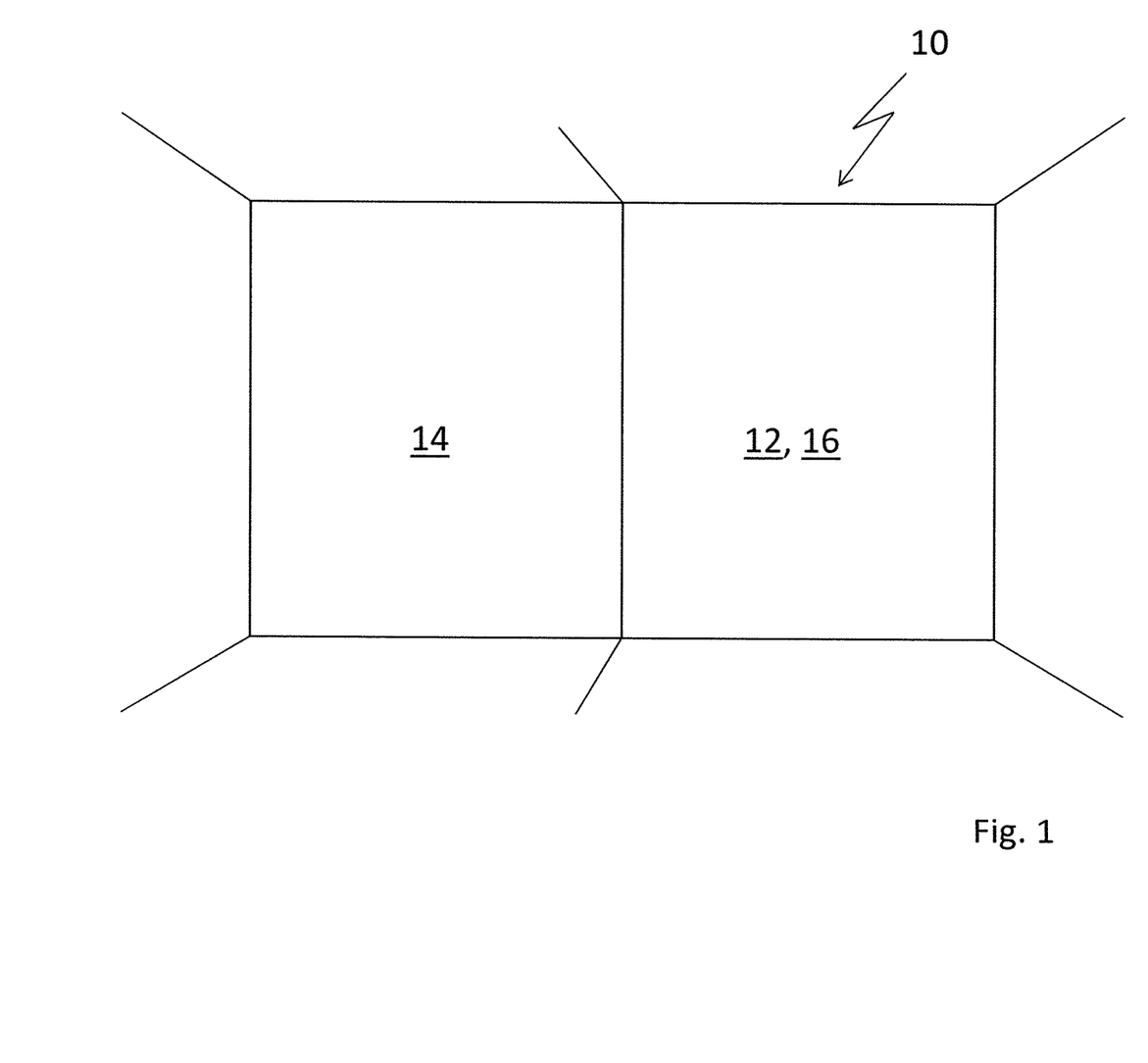
FIG. 1 shows a schematic top view of a vehicle roof according to the invention having a fixed roof element.
Figure 2:
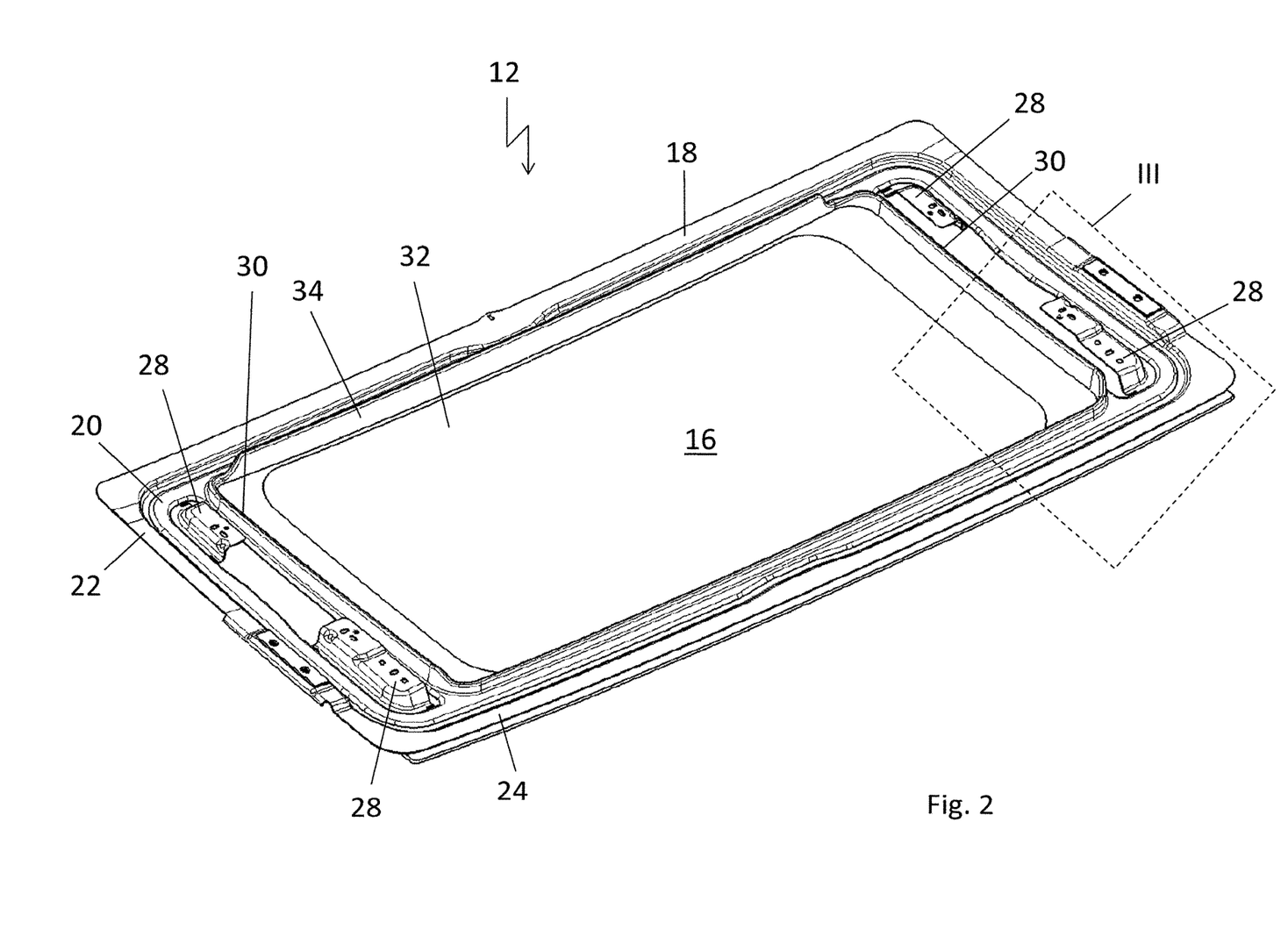
FIG. 2 shows a bottom view of a fixed roof element.
Figure 3:
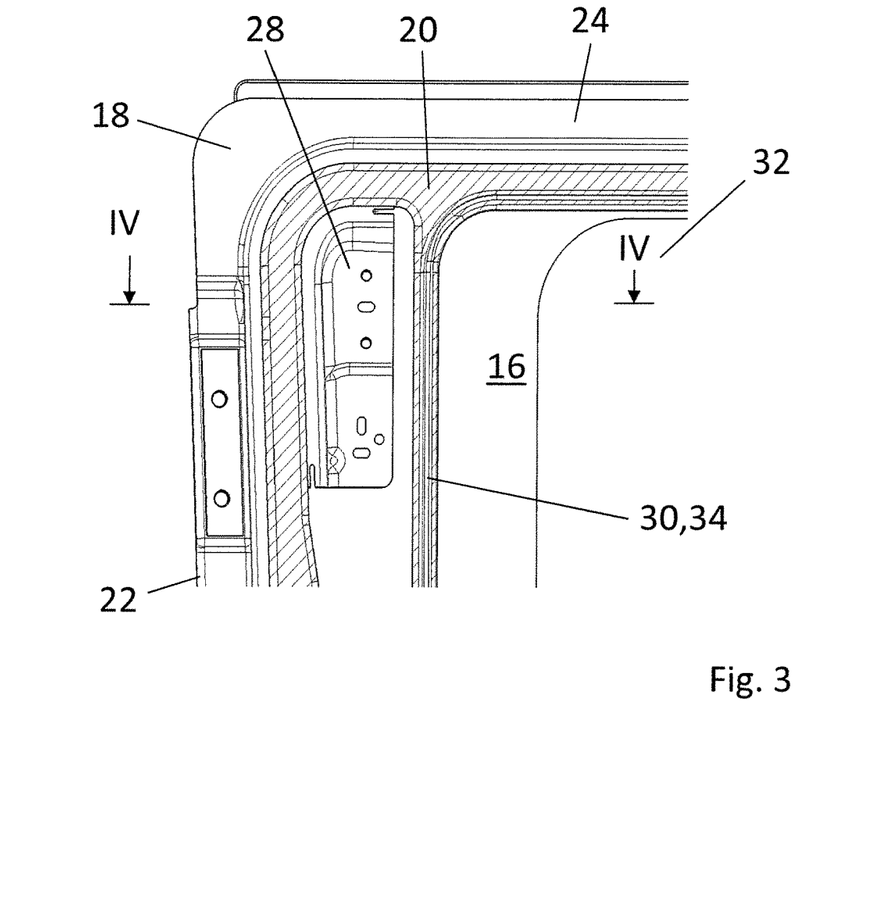
FIG. 3 shows a top view of a corner region III of the fixed roof element according to FIG. 2 (framed by dashed lines in FIG. 2)
Figure 4:
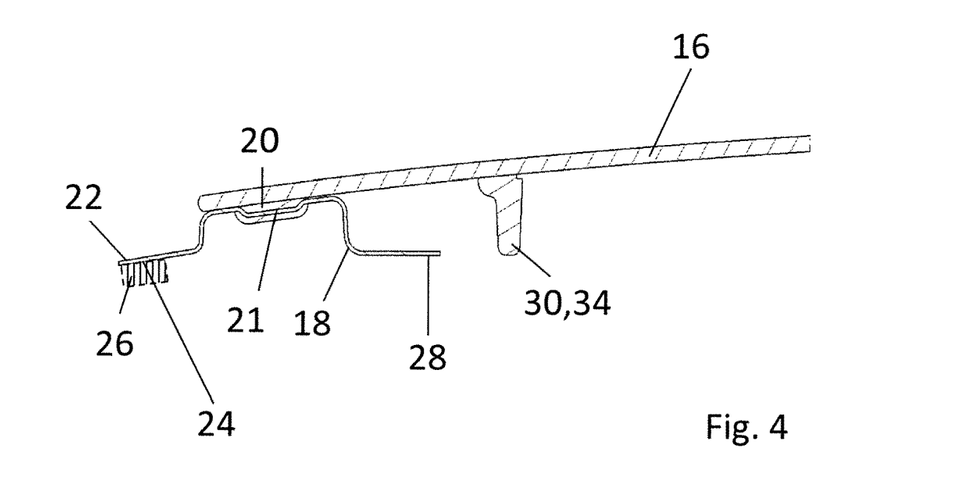
FIG. 4 shows a section through the fixed roof element along line IV-IV in FIG. 3.

As it can in particular be taken from FIG. 4, the connecting plate 18 has a chamfer 22 circumferentially along its edge disposed on the outside in relation to the center of the glass panel 16, said chamfer forming a circumferential adhesive surface 24 on its lower side via which the fixed roof element 12 is attached to the vehicle body by means of a bead of glue 26.

In each of the corner regions, the connecting plate 18 has one fixing section 28 having screw-on points for guide rails of the shading system. The fixing sections 28 are disposed on the side of the section foam molded to the edge 20 which faces away from the chamfer 22.

Furthermore, the section foam molded to the edge 20 has one connecting crosspiece 30 along each of the edges extending in the longitudinal direction of the vehicle, said connecting crosspieces being part of a frame-like cover rib 34 which surrounds a see-trough section 32 of the fixed roof element 12. The connecting crosspieces 30 are disposed on the inner sides of the fixing sections 28, which are thus disposed in recesses of the section foam molded to the edge 20.

Figure 5:
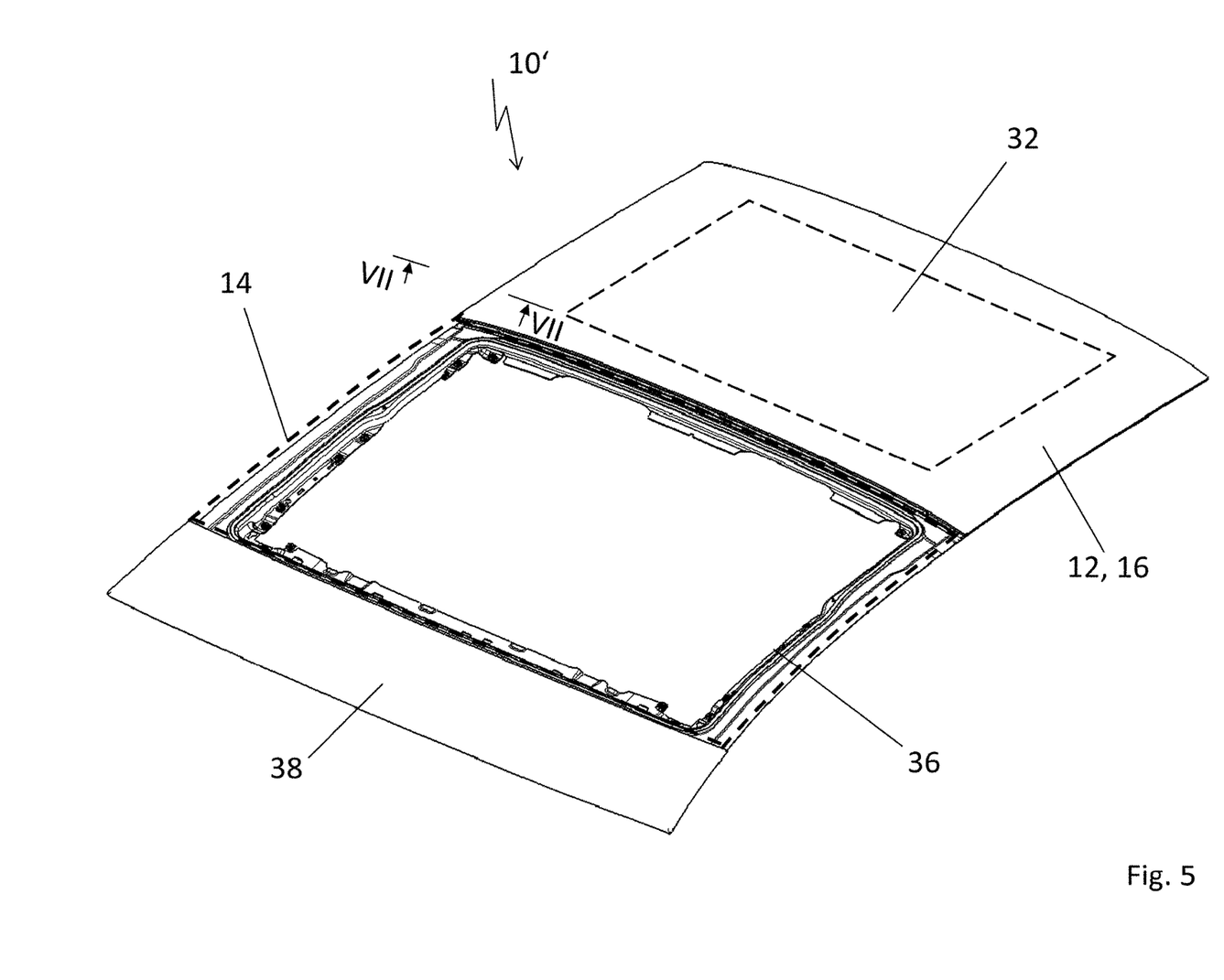
FIG. 5 shows a perspective view of a second embodiment of the vehicle roof according to the invention.
Figure 6:
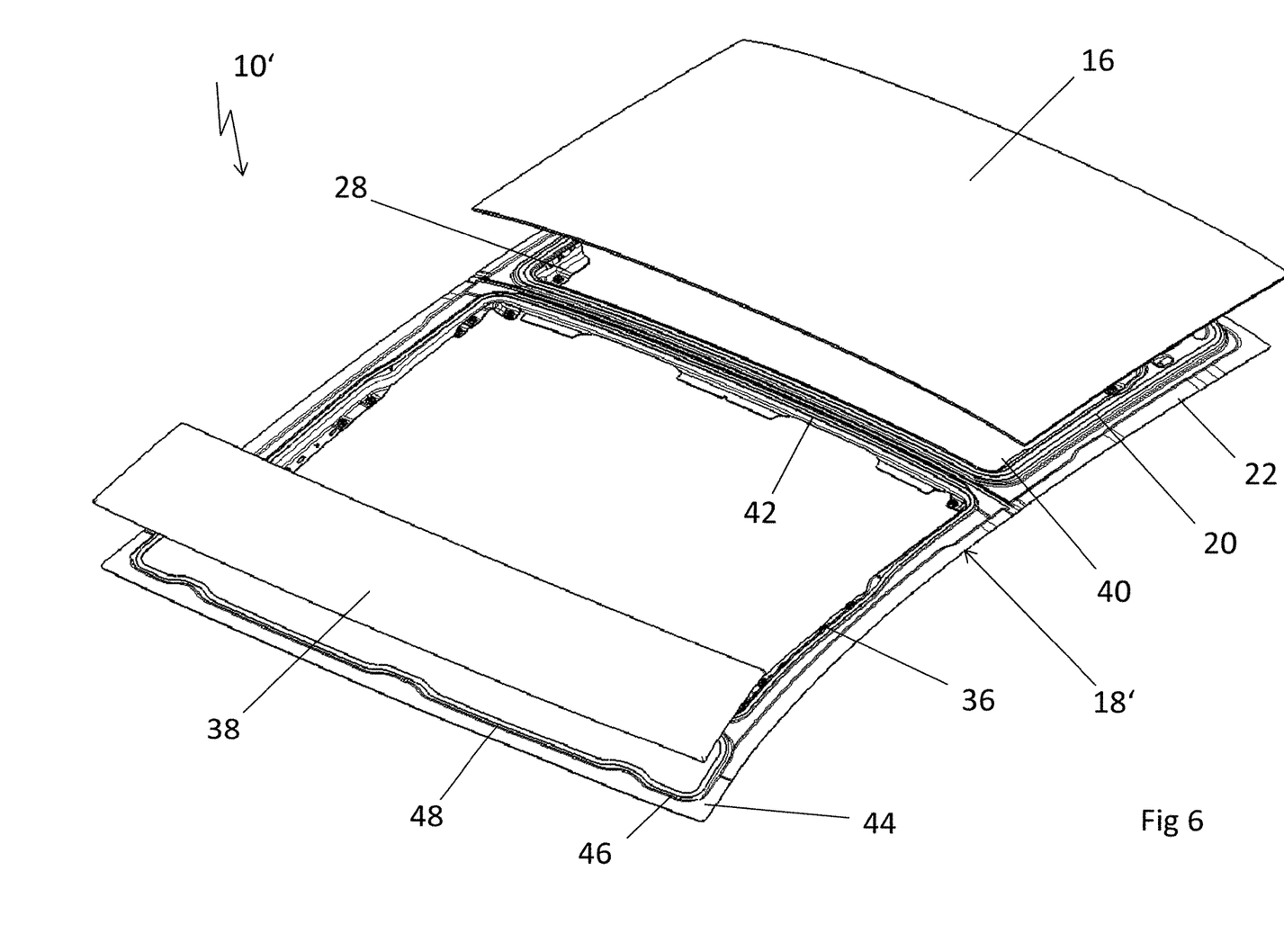
FIG. 6 shows a view of the second embodiment of the vehicle roof which corresponds to FIG. 5, but with detached panels.
Figure 7:
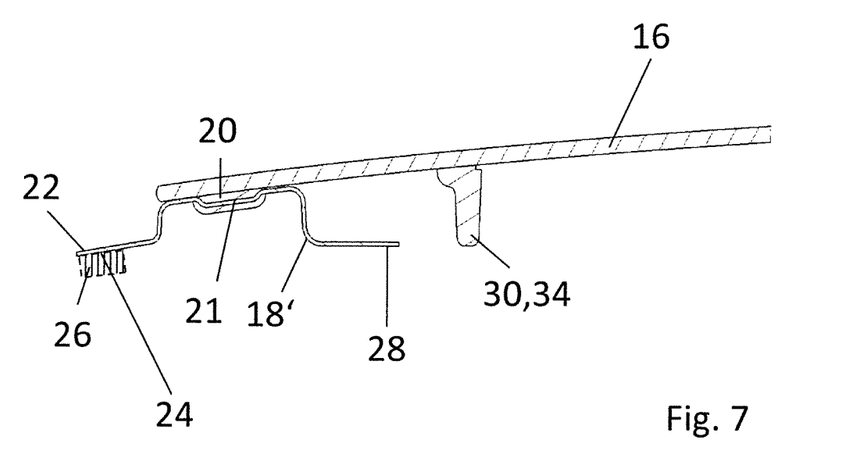
FIG. 7 shows a section through the vehicle roof according to FIG. 5 along line VII-VII in FIG. 5.

FIGS. 5 to 7 illustrate a roof 10' which constitutes another embodiment of a vehicle roof according to the invention and is also realized as a panoramic roof which has a fixed roof element 12 having a glass panel 16 extending from a rear edge of the vehicle 10' up to a central region of the roof 10'. In the front of the fixed roof element 12, a roof opening 36 is realized which can selectively be closed or opened by means of a displaceable lid element 14 (illustrated in dashed lines in FIG. 5). The lid element 14 can be displaced between its closed position and its open position by means of displacing kinematics (not illustrated in more detail), the roof opening 36 being at least partially cleared and the lid element 14 having been moved over the fixed roof element 12 in said open position. In the front of the roof opening 36, the roof 10' has a cover panel 38 which can be manufactured from glass, plastic or sheet metal.

Corresponding to the embodiment according to FIGS. 1 to 4, the roof 10' has a connecting plate 18' which is realized so as to be circumferential and frame-like in the region of the fixed roof element 12 and circumferentially limits a rear roof opening 40 which is covered by the glass panel 16. The rear roof opening 40 is separated from the front roof opening 36, which can be closed by means of the lid element 14, via a crosspiece 42 which is also formed by the connecting plate 18. In the front of the roof opening 36, the connecting plate 18' realizes a planar bearing section or shield section 44 on which the cover panel 38 is disposed.

As it can be taken from FIG. 7, the connecting plate 18' has a chamfer 22 circumferentially along its disposed edge, said chamfer 22 forming a circumferential adhesive surface 24 on its lower side, the vehicle roof 10' being able to be attached to a vehicle body by means of a bead of glue 26 via said adhesive surface 24.

The connecting plate 18' is a one-piece punched or bent piece from steel or also from another light metal or it is alternatively manufactured from individual legs which are welded to each other.

As with the embodiment according to FIGS. 1 to 4, the glass panel 16 is attached to the connecting plate 18' via a circumferential foam molded section 20 which is made from polyurethane and which fills a circumferential reinforcing fin 21 of the connecting plate 18' and foul's a first molded section. The front cover panel 38 is attached to the connecting plate 18 via a foam molded section 46 which is made from polyurethane and which fills a reinforcing rib 48 of the shield section 44 and forms a second molded section. The reinforcing rib 48 and the foam molded section 46 are realized circumferentially. The two molded sections are realized in a molding tool during the production of the roof 10', i.e. the glass panel 16 and the cover panel 38 are fixed at the connecting plate 18' in one method step.

As FIG. 7 shows, the section foam molded to the edge 20, corresponding to the embodiment according to FIGS. 1 to 4, has one connecting crosspiece 30 along each of the edges extending in the longitudinal direction of the vehicle, said connecting crosspieces 30 being part of a frame-like cover rib 34 which surrounds a see-trough section 32 of the glass panel 16. The connecting crosspieces 30 are disposed on the inner sides of fixing sections 28 which are part of the connecting plate 18' and to which guide rails of a shading system can be fastened.

The invention claimed is:

1. A vehicle roof, comprising:
a fixed roof element having one of a glass, plastic or sheet metal panel provided with a circumferential molded section which is formed by a section foam molded to an edge or a section injection molded to the edge, and
having a circumferential frame-like connecting plate which is fastened to the glass, plastic or sheet metal panel by the molded section and which has a circumferential adhesive surface for attaching the fixed roof element to a vehicle body,
wherein the vehicle comprises a roof substructure which is fixed relative to the vehicle and on which the fixed roof element is fastened via a bead of glue disposed at the adhesive surface.

2. A vehicle roof, comprising:
a fixed roof element having one of a glass, plastic or sheet metal panel provided with a circumferential molded section which is formed by a section foam molded to an edge or a section injection molded to the edge, and
having a circumferential frame-like connecting plate which is fastened to the glass, plastic or sheet metal panel by the molded section and which has a circumferential adhesive surface for attaching the fixed roof element to a vehicle body,
wherein the adhesive surface forms a frame surface which surrounds the molded section.

3. The vehicle roof according to claim 1, wherein the adhesive surface is realized on the bottom side of a chamfer of the connecting plate, said chamfer being on the outside in relation to a center of the fixed roof element.

4. The vehicle roof according to claim 1, wherein the connecting plate is realized in one piece.

5. The vehicle roof according to claim 1, wherein the connecting plate has a fixing section for attaching a functional element, in particular an element of a shading assembly.

6. The vehicle roof according to claim 1, wherein the molded section forms a circumferential cover rib which in particular surrounds a see-trough section of the fixed roof element.

7. The vehicle roof according to claim 1, wherein the molded section fills a circumferential reinforcing fin of the connecting plate disposed on an upper side.

8. A vehicle roof, comprising:
a fixed roof element having one of a glass, plastic or sheet metal panel provided with a circumferential molded section which is formed by a section foam molded to an edge or a section injection molded to the edge, and
having a circumferential frame-like connecting plate which is fastened to the glass, plastic or sheet metal panel by the molded section and which has a circumferential adhesive surface for attaching the fixed roof element to a vehicle body,
wherein the vehicle roof comprises a cover panel made from glass, plastic or sheet metal and which is fastened to the connecting plate via a second molded section which is formed by a foam molded section or an injection molded section which is realized circumferentially.

9. The vehicle roof according to claim 8, wherein the second molded section fills a second upper-side reinforcing fin of the connecting plate, said reinforcing fin being realized at a shield section of the connecting plate.

10. The vehicle roof according to claim 1, wherein the connecting plate defines a first roof opening in the region of the fixed roof element covered by the glass, plastic or sheet metal panel, and realizes a second roof opening which can selectively be closed or opened by a lid element or which is covered by a second glass, plastic or sheet metal panel which is immovable as against the connecting plate.

* * * * *